United States Patent
Hoferer et al.

(10) Patent No.: US 11,231,492 B2
(45) Date of Patent: Jan. 25, 2022

(54) RADAR FILL LEVEL MEASUREMENT DEVICE AND METHOD FOR OPERATING A RADAR FILL LEVEL MEASUREMENT DEVICE

(71) Applicant: VEGA Grieshaber KG, Wolfach (DE)

(72) Inventors: Christian Hoferer, Offenburg (DE); Joachim Benz, Hausach (DE); Thomas Deck, Wolfach (DE); Johannes Franz, Hohberg (DE); Martin Gaiser, Alpirsbach (DE); Karl Griessbaum, Muehlenbach (DE); Juergen Haas, Oberwolfach (DE); Andreas Isenmann, Haslach im Kinzigtal (DE); Manuel Kaufmann, Berghaupten (DE); Juergen Motzer, Gengenbach (DE); Daniel Schultheiss, Hornberg (DE); Roland Welle, Hausach (DE)

(73) Assignee: VEGA Grieshaber KG, Wolfach (DE)

(*) Notice: Subject to any disclaimer, the term of this patent is extended or adjusted under 35 U.S.C. 154(b) by 200 days.

(21) Appl. No.: 16/014,217

(22) Filed: Jun. 21, 2018

(65) Prior Publication Data
US 2019/0033116 A1    Jan. 31, 2019

(30) Foreign Application Priority Data
Jul. 25, 2017    (EP) .................................... 17183047

(51) Int. Cl.
*G01S 13/08* (2006.01)
*G01S 13/88* (2006.01)
(Continued)

(52) U.S. Cl.
CPC .......... *G01S 13/08* (2013.01); *G01F 25/0061* (2013.01); *G01S 7/2927* (2013.01); *G01S 13/88* (2013.01); *G01F 23/284* (2013.01)

(58) Field of Classification Search
CPC .. G01F 23/284; G01F 25/006; G01F 25/0076; G01S 7/2927; G01S 13/88
(Continued)

(56) References Cited

U.S. PATENT DOCUMENTS 5,508,706 A  *  4/1996  Tsou ....................... G01S 7/032
                                                    342/192
5,614,911 A     3/1997  Otto et al.
(Continued)

FOREIGN PATENT DOCUMENTS

CN              103885038 A  *  6/2014  ............. G01S 7/282
DE      10 2006 034 554 A1     1/2008
(Continued)

*Primary Examiner* — Vladimir Magloire
*Assistant Examiner* — Alexander L. Syrkin
(74) *Attorney, Agent, or Firm* — Oblon, McClelland, Maier & Neustadt, L.L.P.

(57) ABSTRACT

A radar fill level measurement device for determining a fill level of a medium is provided, including a transmitter configured to transmit a transmission signal towards the medium; a receiver configured to receive a reception signal reflected by the medium; and a controller configured to determine the fill level of the medium based on the reception signal and based on at least one evaluation parameter, the radar fill level measurement device being configured to vary a transmitting power of the transmission signal, the controller being further configured to determine a current transmitting power of the transmission signal, and the controller being further configured to vary, based on the determined current transmitting power, a value of the at least one evaluation parameter and/or at least one measurement signal that correlates with the reception signal, such that the fill level is determined taking into account the transmitting power.

13 Claims, 4 Drawing Sheets

(51) Int. Cl.
*G01S 7/292* (2006.01)
*G01F 25/00* (2006.01)
*G01F 23/284* (2006.01)

(58) Field of Classification Search
USPC ............... 342/124; 73/290 R, 290 V, 861; 324/644, 642
See application file for complete search history.

(56) References Cited

U.S. PATENT DOCUMENTS

| | | | | |
|---|---|---|---|---|
| 6,684,696 | B2 * | 2/2004 | Schultheiss | G01F 23/284 73/290 R |
| 6,684,919 | B2 * | 2/2004 | Gaiser | G01F 23/284 141/198 |
| 6,806,824 | B2 * | 10/2004 | Kornle | G01F 23/284 342/118 |
| 7,460,057 | B2 * | 12/2008 | Fehrenbach | G01F 23/284 342/124 |
| 8,655,605 | B2 * | 2/2014 | Welle | G01F 23/2962 702/55 |
| 8,776,594 | B2 * | 7/2014 | Welle | G01S 13/08 73/290 V |
| 8,843,329 | B2 * | 9/2014 | Griessbaum | G01F 23/284 702/55 |
| 8,931,339 | B2 * | 1/2015 | Muller | G01F 23/0076 73/290 R |
| 9,354,100 | B2 * | 5/2016 | Griessbaum | G01F 23/292 |
| 10,039,064 | B1 * | 7/2018 | Gibbons | H04H 20/71 |
| 10,389,396 | B1 * | 8/2019 | Gibbons | H04B 1/1638 |
| 2007/0010181 | A1 | 5/2007 | Eriksson et al. | |
| 2007/0101810 | A1 * | 5/2007 | Eriksson | G01F 23/284 73/290 V |
| 2007/0188374 | A1 * | 8/2007 | Fehrenbach | G01S 13/87 342/124 |
| 2008/0024145 | A1 | 1/2008 | Schultheiss et al. | |
| 2008/0282793 | A1 * | 11/2008 | Jirskog | G01F 23/284 73/292 |
| 2008/0297403 | A1 * | 12/2008 | Akerstrom | G01F 23/284 342/175 |
| 2009/0085795 | A1 * | 4/2009 | Fehrenbach | G01S 7/282 342/124 |
| 2010/0070207 | A1 * | 3/2010 | Sai | G01F 23/284 702/55 |
| 2010/0175470 | A1 * | 7/2010 | Schrier | G01F 23/284 73/290 V |
| 2016/0327423 | A1 | 11/2016 | Luber et al. | |
| 2017/0016754 | A1 * | 1/2017 | Fischer | G01S 13/34 |
| 2017/0238203 | A1 * | 8/2017 | Dzierwa | H04B 17/309 455/67.11 |
| 2018/0259633 | A1 * | 9/2018 | Kikuchi | G01F 23/0076 |

FOREIGN PATENT DOCUMENTS

| | | | | |
|---|---|---|---|---|
| DE | 10 2013 109 606 A1 | 3/2015 | | |
| EP | 0660135 A2 * | 6/1995 | ........... | G01S 13/345 |
| EP | 0 670 048 | 9/1995 | | |
| EP | 0 670 048 B1 | 11/1998 | | |
| EP | 2 372 388 A1 | 10/2011 | | |
| EP | 2 418 465 A1 | 2/2012 | | |
| EP | 1992923 B1 * | 7/2012 | ........... | G01F 23/284 |
| EP | 2549292 B1 * | 2/2018 | ........... | G01S 13/931 |
| WO | WO 95/08780 A1 | 3/1995 | | |
| WO | WO 03/016835 A1 | 2/2003 | | |

\* cited by examiner

RADAR FILL LEVEL MEASUREMENT DEVICE AND METHOD FOR OPERATING A RADAR FILL LEVEL MEASUREMENT DEVICE

CROSS-REFERENCE TO RELATED APPLICATION

This application claims benefit of the filing date of European Patent Application No. 17 183 047.4, filed on 25 Jul. 2017, the entire content of which is incorporated herein by reference.

FIELD

The invention generally relates to the field of radar-based fill level measurement. The invention relates in particular to a radar fill level measurement device having adaptive transmitting power for determining a fill level of a medium. The invention also relates to a method for operating a radar fill level measurement device of this kind. The invention further relates to a program element which instructs a radar fill level measurement device to carry out the method, and to a computer-readable storage medium, on which the program element is stored.

BACKGROUND

Radar-based fill level measurement devices and/or radar fill level measurement devices typically comprise a radar module for generating a transmission signal, in particular a high-frequency radar transmission signal.

Generally, in radar fill level measurement devices, the transmission signal or radar transmission signal is emitted to a surface of a medium, whereupon part of the transmission signal is reflected by the surface and is received in turn by the radar fill level measurement device as a reception signal. Based on a propagation time method, the distance of the radar fill level measurement device from the surface of the medium and/or the fill level of the medium can thus be determined.

In order to actually ascertain the fill level, the reception signal is generally converted into a digital measurement signal that correlates with the reception signal. The obtained measurement signal is then often evaluated and/or processed, taking into account at least one evaluation parameter. For example, a predefined and fixed threshold for an amplitude of the reception signal can be used for evaluation. For example, signal portions of the measurement signal and/or measurement data that do not reach and/or exceed the threshold may be disregarded when determining the fill level.

SUMMARY

An present disclosure describes providing an improved and versatile radar ill level measurement device.

The described embodiments, together with further advantages, will be best understood by reference to the following detailed description taken in conjunction with the accompanying drawings.

A described embodiment relates to a radar fill level measurement device, also, referred to, in the following as a fill level measurement device, for determining a fill level of a medium. The radar fill level measurement device comprises a transmitting unit for transmitting a transmission signal, a radar transmission signal and/or a radar signal towards the medium. The radar fill level measurement device further comprises a receiving unit for receiving a reception signal and/or radar reception signal reflected to the medium or to the surface of the medium, and a controller. The controller is configured to determine the fill level of the medium based on the reception signal and based on at least one evaluation parameter. The radar fill level measurement device is also configured to vary, to modify or to adapt a transmitting power and/or a transmitting level of the transmission signal. The radar fill level measurement device can thus be a fill level measurement device having adaptive transmitting power. The controller is also configured to determine a current transmitting power of the transmission signal and/or a variation of the transmitting power relative to a preceding and/or past fill level measurement. In addition, the controller is configured to determine, to calculate, to vary, to modify and/or to adapt, based on the determined current transmitting power and in order to determine the fill level, a value of the at least one evaluation parameter, the reception signal and/or at least one measurement signal that correlates with the reception signal, such that the fill level is determined taking into account the current transmitting power.

The radar fill level measurement device according to a described embodiment may be configured in particular to determine the fill level according to the propagation time principle. However, the described embodiments may also be used advantageously in other fill level measurement devices, for example in ultrasonic fill level measurement devices, in optical fill level measurement devices and/or radiometric fill level measurement devices.

Here and in the following, the evaluation parameter may denote a parameter which is taken into account and/or used by the controller to evaluate the reception signal and/or to evaluate the measurement signal that correlates with the reception signal. For example, the controller can be configured to compare at least part of the reception signal and/or of the measurement signal with a value of the evaluation parameter, in order to determine and/or ascertain the fill level of the medium.

The transmitting unit may denote, for instance, a transmission circuit, a transmission channel and/or transmission circuitry of the radar fill level measurement device. Similarly, the receiving unit may denote a receiving circuit, a receiving channel and/or receiving circuitry of the radar fill level measurement device. In this case, the transmitting unit and the receiving unit may also be formed as a combined transceiver unit. The transceiver unit may comprise, for example, a duplexer for differentiation, in particular for time differentiation, of the transmission signal and the reception signal, which is time delayed compared with the transmission signal. The controller may also denote a logic unit, a control circuit, control circuitry, an evaluation circuit and/or a CPU controller.

In radar fill level measurement devices, the transmission signal is emitted by the transmitting unit towards the medium and at least partially reflected by the surface of the medium. The reception signal reflected by the surface of the medium can be received by the receiving unit of the fill level measurement device. The signal propagation time between the transmission signal and the reception signal may be ascertained by the fill level measurement device and/or the controller of the radar fill level measurement device. As a result, if the propagation speed of the transmission signal and/or the reception signal is known, for example taking into account an installation position of the fill level measurement device, the fill level of the medium can be ascertained.

The described embodiments can in particular be considered to be based on the knowledge described in the following. In radar fill level measurement devices, it can be advantageous to vary, to adapt and/or to modify the transmitting power and/or a transmitting level of the transmission signal, in order to thus accomplish a current measurement task, for example. The transmitting power and/or the transmitting level can be reduced, for instance, in the case of a highly reflective medium and/or material to be measured that largely reflects the transmitted signal. By contrast, in the case of a medium that only reflects a small proportion of the transmission signal, it can be advantageous to increase the transmitting power and/or the transmitting level in order to obtain an evaluable and meaningful reception signal. It should be noted that a poorly reflected transmission signal, i.e., a reception signal having a low reception power and/or low reception level, cannot necessarily be traced back to the physical properties of the medium to be measured. For a radar fill level measurement device, a build-up of deposits on the antenna and/or the antenna being dirty, for example, can impair the reception properties, and therefore an increase in the transmitting power may be advantageous in order to still be able to precisely measure the fill level. Moreover, by varying the transmitting power of the transmitting unit, manual maintenance of the radar fill level measurement device can be delayed or even made redundant. In addition, by adapting the transmitting power, the energy required by the radar fill level measurement device for a measurement can be reduced.

The part of the transmission signal reflected by the medium and at least partially received as a reception signal may for instance be filtered and/or amplified using complex circuitry for example in the form of at least one filter and/or amplifier.

An analogue-to-digital conversion (AD conversion) of the reception signal then generally takes place. In this case, the reception signal can be sampled and digitalised sample values of the reception signal, which, here and in the following, may be referred to as a measurement signal that correlates with the reception signal, can be stored in a data memory, a memory means and/or a memory apparatus of the radar fill level measurement device and evaluated by means of the controller, for instance by means of a microcontroller or another controller, to determine a distance between the medium and the radar fill level measurement device and/or to determine a fill level of the medium.

The controller can be configured to ascertain, for example by means of a suitable evaluation method and/or evaluation algorithm, from the sampled reception signal, i.e. the digital measurement signal that correlates with the reception signal, the reflection by the surface of the medium and, based on this, the fill level of the medium. Other reflections in the reception signal and/or the measurement signal, which can occur, for example, as a result of container fixtures such as stirrers, viewing windows and/or terminals, as a result of the antenna of the radar fill level measurement device itself and/or as a result of dirt, should be identified by the controller and not counted as a reflection by the surface of the medium and/or of the fill level. For conventional radar fill level measurement device, one or more evaluation parameters can be used for this purpose, it being possible for the at least one evaluation parameter to be, for instance, a predefined and fixed threshold, a threshold value and/or a fixed limit value for the amplitude of the reception signal and/or of the digital measurement signal. A value of the at least one evaluation parameter may thus denote a threshold value for the amplitude of the reception signal and/or of the measurement signal, for instance. A first threshold, below which portions of the measurement signal are rejected, and a second threshold, above which portions of the measurement signal are rejected, can thus be defined, for example. The installation of the radar fill level measurement device and/or the physical properties of the medium to be measured in the radar fill level measurement device can also be parameterised by means of additional predefined and fixed evaluation parameters and/or stored in a memory apparatus in the radar fill level measurement device. The controller can determine, based on the totality of evaluation parameters mentioned above and/or the associated values of said evaluation parameters, whether a portion of the measurement signal, for instance a peak in the measurement signal, is undesired interference, for example a reflection by the antenna of the radar fill level measurement device and/or by container fixtures, or is the surface of the medium to be measured. However, storing fixed values of the evaluation parameters in a memory apparatus of the fill level measurement device can lead to a distortion of the measurement results when varying the transmitting power, since, for instance when the transmitting power is too low and thus the reception power of the reception signal is too low, an amplitude of the reception signal and/or of the correlating measurement signal may be too low at least in one portion. A reflection coming from the surface of the medium may thus be identified and/or rejected incorrectly by the controller as an interference reflection, for instance.

In order to ensure that the reception signal and the correlating digital measurement signal can also be reliably and precisely evaluated for an adaptive transmitting level and/or an adaptive transmitting power, the controller is configured according to the described embodiments to determine the transmitting power and to determine, to modify, to scale, to vary and/or to adapt a value of the at least one evaluation parameter according to the transmitting power and/or based on the transmitting power. Thus, when the transmitting power is increased, for instance relative to a previous measurement, the value of the evaluation parameter is increased accordingly, and when the transmitting power is reduced, the value can be reduced accordingly. The controller can also be configured to determine a variation of the transmitting power relative to a previous measurement, and to vary, to adapt and/or to modify the value of the at least one evaluation parameter according to the determined variation. In this case, the determined variation may be an amount by which the transmitting power has been varied, and may include a direction or a sign of the variation. In other words, the controller can be configured to determine the amount of variation and to determine whether the transmitting power has been increased or reduced relative to the previous measurement. As a result, the quality of the evaluation of the reception signal and/or of the correlating digital measurement signal can be increased. Overall, the precision and/or accuracy of the fill level measurement can thus be improved and an improved fill level measurement device can be provided.

Alternatively or additionally, the controller can be configured to vary, to scale, to modify and/or to adapt the reception signal and/or the correlating measurement signal based on and/or according to the transmitting power. For example, the reception signal and/or the measurement signal can be amplified and/or reduced according to the transmitting power.

The transmitting power itself can be varied, adjusted and/or adapted on the basis of the reception signal of a temporally preceding measurement or temporally preceding measurements, for example. In particular, for example, the amplitude of the reflection by the surface of the medium can be used to establish whether the transmitting power should be reduced or increased. The transmitting power can in this case be varied in both a continuous and stepwise manner, i.e. in predefined increments. A maximum or minimum variation can also be provided. In general, the transmitting power can be given in absolute values, in relative values relative to a reference measurement and/or as a percentage. Similarly, the value of the at least one evaluation parameter, the reception signal and/or the measurement signal that correlates with the reception signal can be varied, adapted and/or modified in absolute values, in relative values and/or as a percentage.

The medium can generally be a filling material, a liquid and/or a fluid in a container. Alternatively or additionally, the medium can be bulk material in a container and/or in a deposit location, such as a bulk material stockpile. The medium may also denote a fluid medium such as a coagulation, and the radar fill level measurement device according to the described embodiments can, as it were, be used for a coagulation measurement. Moreover, here and in the following, the terms surface of the medium, medium surface and filling material surface can be used synonymously.

According to a described embodiment, the radar fill level measurement device includes a memory apparatus for storing the at least one evaluation parameter. In particular, the at least one evaluation parameter can be stored in the memory. The stored evaluation parameter can also be overwritten and/or modified by the controller, for instance during initialisation and/or operation of the radar fill level measurement device. A plurality of evaluation parameters and/or a set of evaluation parameters can also be stored in the memory apparatus. For example, a set of parameters may include a clutter curve, a clutter suppression, an interference point profile and/or an empty container profile.

According to a described embodiment, the at least one evaluation parameter includes a threshold value and/or a limit value for an amplitude of the reception signal and/or a measurement signal that correlates with the reception signal. In other words, a value of the evaluation parameter may denote a threshold value for the amplitude of the reception signal and/or of the measurement signal. The controller is also configured to determine, to vary, to scale, to modify and/or to adapt the threshold value based on the determined current transmitting power.

The measurement signal is typically measured in the form of an echo curve, which may have amplitudes of different levels for different propagation times of the transmission signal and/or reception signal. In this case, the different propagation times can correspond to different distances from the radar fill level measurement device by which the transmission signal has been reflected. An amplitude, a peak, or a deflection in the echo curve may be caused by an interfering object or the surface of the medium to be measured, for instance. To determine the distance from the medium and/or the fill level of the medium in a container, it can be advantageous to set a lower limit and/or an upper limit for an amplitude, for instance in the form of a threshold and/or a threshold value. The amplitudes and/or portions of the measurement signal below and/or above the threshold may be caused by interference points, interfering objects and/or multiple reflections in the container, for example. By using thresholds and/or limit values, these interferences can be advantageously filtered out of the measurement signal.

According to another described embodiment, the controller is configured to determine the fill level of the medium based on a plurality of evaluation parameters. In order to determine the fill level, the controller is configured to determine, to vary, to scale, to modify and/or to adapt, based on the determined current transmitting power, a value of each evaluation parameter. Scaling factors and/or shifts, for example an offset, can also be determined for, each of the evaluation parameters, in order to adapt the values of at least some of the evaluation parameters. In this case, the individual values of the evaluation parameters can be varied identically or differently to one another. For example, the controller can be configured to determine a scaling factor for the values of the individual evaluation parameters, and the values of each evaluation parameter can be modified based on the determined scaling factor, for instance by multiplying the scaling value by the value of the associated evaluation parameter. Alternatively or additionally, the controller can be configured to determine different scaling factors for the values of different evaluation parameters, such that the values of individual evaluation parameters are modified differently relative to one another based on the scaling factors.

Alternatively or additionally, the controller can determine one or more shifts for one or more values of the evaluation parameters. The value can thus be modified by adding and/or subtracting the shift and a value of an evaluation parameter. Moreover, for each evaluation parameter, a mathematical formula and/or a functional relationship for describing a relationship and/or a dependency between the particular value of an evaluation parameter and the transmitting power can be stored, for instance in the memory apparatus. For this purpose, the controller can be configured to calculate, based on the transmitting power as an input variable for the mathematical formula and/or the functional relationship, the value of the associated evaluation parameter. A model for calculating a value of one or more evaluation parameters can also be stored in the memory apparatus, and the controller can also be configured to determine, based on the model and on the transmitting power, a value for one or more evaluation parameters. In addition, the controller can be configured to determine, to vary, and/or to adapt, based on the transmitting power and based on at least one other influencing variable, such as a temperature, an air pressure, and/or an air humidity, at least one value of at least one evaluation parameter.

According to a described embodiment, the controller is configured to vary, to modify and/or to adapt the value of the at least one evaluation parameter linearly, logarithmically, quadratically or exponentially with the transmitting power, for instance proportionally or inversely proportionally. Any other dependencies between the value of the evaluation parameter and the transmitting power may also be used. The controller is also configured to vary, to modify and/or to adapt the at least one measurement signal that correlates with the reception signal and/or with the reception power linearly, logarithmically, quadratically or exponentially with the transmitting power, for instance proportionally or inversely proportionally. In addition, the controller can be configured to vary the measurement signal and/or at least one value of at least one evaluation parameter based on a formula, a model, a characteristic map and/or a lookup table.

According to a described embodiment, the at least one evaluation parameter includes an interfering signal suppression, which comprises information relating to a position of interfering objects, in particular a position of interfering objects in a container. These interfering objects may be reflective objects in a container, for instance container fixtures, stirrers, viewing windows, inlets, and/or outlets.

An interfering signal suppression, which may comprise a clutter profile and/or an empty container profile, for instance, can be carried out as a reference measurement when the fill level is low and/or the container is empty. Here, the transmission signal can be emitted into the container and the resulting reflections can be measured by the radar fill level measurement device and can be evaluated by the controller by determining the clutter profile and/or the empty container profile. Since the measurement is typically carried out without a medium and/or when the fill level is low, the reflections may correlate with the container geometry and or with fixtures in the container and/or be caused thereby. The clutter profile, the empty container profile and/or the interfering signal suppression can then be stored in the memory apparatus, and the controller can be configured to evaluate the reception signal and/or the measurement signal based on the determined interfering signal suppression and/or to compare the reception signal and/or the measurement signal with the interfering signal suppression. For example, the controller can be configured to identify portions of the reception signal and/or of the measurement signal that have an amplitude above and/or below such an interfering signal suppression as a reflection of the medium. The controller can also be configured to ignore signal portions of the reception signal and/or of the measurement signal based on the interfering signal suppression for determining the fill level.

For example, by means of the interfering signal suppression, it can be determined that a stirrer is arranged in a container at a specific distance from the fill level measurement device. Based on this information, the controller can discount and/or suppress reflections at this distance.

According to another described embodiment, the interfering signal suppression has a clutter profile which correlates with the position of interfering objects, for example in a container. Alternatively or additionally, the interfering signal suppression comprises an empty container profile, which correlates with a geometry of a container for the medium. As a result, any interferences can be fully taken into account and/or corrected when evaluating the reception signal and/or the measurement signal.

According to a described embodiment, the controller is configured to determine a reference value of the at least one evaluation parameter by means of at least one reference measurement at a predetermined transmitting power. The controller is also configured to determine a functional relationship between values of the at least one evaluation parameter and the transmitting power based on the at least one reference measurement. This can be carried out based on a measurement and/or modelling of an electronic circuit of the radar fill level measurement device, for example. For example, by modelling the electronic circuit of the radar fill level measurement device, a relative relationship between the transmitting power and the value of the at least one evaluation parameter can be determined. Based on the reference measurement, absolute values of the at least one evaluation parameter can thus be determined.

Alternatively or additionally, the controller can be configured to determine at least one reference interfering signal suppression by means of at least one reference measurement at a predetermined transmitting power. The controller can also be configured to determine a functional relationship between values of the at least one reference interfering signal suppression and the transmitting power based on the at least one reference measurement. This can be carried out by means of a measurement and/or modelling of the electronic circuit, for example.

According to another described embodiment, the controller is configured to determine a first reference value of the at least one evaluation parameter and/or a first reference interfering signal suppression by means of a first reference measurement at a first transmitting power.

Moreover, the controller is configured to determine a second reference value of the at least one evaluation parameter and/or a second reference interfering signal suppression by means of a second reference measurement at a second transmitting power, which is different from the first transmitting power. The controller is configured to determine a functional relationship between values of the at least one evaluation parameter and the transmitting power based on the first reference measurement and the second reference measurement. Alternatively or additionally, the controller can be configured to determine a functional relationship between values of the interfering signal suppression and the transmitting power based on the first reference measurement and/or the second reference measurement. Based on the determined first reference value and the second reference value, the value of the at least one evaluation parameter can be determined, for instance by means of interpolation and/or extrapolation, for a transmitting power which is different from the first and from the second transmitting power. Similarly, values of the interfering signal suppression can be determined based on the first reference interfering signal suppression and the second reference interfering signal suppression for a transmitting power which is different from the first and from the second transmitting power.

According to a described embodiment, the first transmitting power is a maximum transmitting power and the second transmitting power is a minimum transmitting power. In this way, it can be ensured that, for any transmitting power between the first and the second transmitting power, a value of the at least one evaluation parameter and/or an interfering signal suppression can be reliably determined, for instance by means of interpolation.

According to a described embodiment, the radar fill level measurement device and/or the controller is configured to vary, to modify and/or to adapt the transmitting power of the transmission signal based on a temporally preceding reception signal, e.g. based on an amplitude of the reflection by the surface of the medium and/or by the filling material surface. By adapting the transmitting power on the basis of the preceding reception signal, the transmission signal can be advantageously adapted to physical properties of the medium, in particular a reflectivity of the medium for the transmission signal. If a medium reflects, for instance, a high proportion of the transmission signal, the reception power of the reception signal is thus correspondingly high, and the transmitting power can be reduced in subsequent measurements without sacrificing quality in terms of evaluating the reception signal. According to a described embodiment, the radar fill level measurement device and/or the controller is configured to vary, to modify and/or to adapt the transmitting power of the transmission signal in a continuous and/or stepwise manner between a minimum transmitting power and a maximum transmitting power. The individual steps of the stepwise adaptation of the transmission signal can be distributed over the range of transmitting power in any desired manner.

According to another described embodiment, the controller is configured to vary, to modify and/or to adapt the transmitting power by transmitting a control signal to the transmitting unit. Alternatively or additionally, the controller is configured to determine the transmitting power by querying the transmitting unit. For instance, the transmitting power can be given in absolute values, in relative values relative to a reference measurement and/or as a percentage. The value of the at least one evaluation parameter and/or an interfering signal suppression can thus be correspondingly adapted and/or varied in absolute terms, relatively and/or as a percentage. Moreover, the measurement signal that correlates with the reception signal can be adapted and/or varied in absolute terms, relatively, and/or as a percentage.

The varied value of the evaluation parameter and/or varied values of the interfering signal suppression can be stored in the memory unit and/or a memory apparatus of the radar fill level measurement device. In addition, the variation and/or the adaptation of the value of the at least one evaluation parameter and/or values of the interfering signal suppression can also be checked and/or repeated at regular intervals by the controller. This means that it can be checked if the antenna is dirty and/or this can be reliably compensated for, for instance. The controller can also be configured to repeat the at least one reference measurement at particular intervals, in order to check and/or redetermine a correlation between the transmitting power and values of the at least one evaluation parameter and/or values of the interfering signal suppression. In particular, the controller can be configured to take and/or to repeat the reference measurement if the fill level of the medium in the container is less than a predetermined fill level. In other words, taking the reference measurement can be triggered by reaching and/or falling below the predetermined fill level. The predetermined fill level may be approximately 20% of a maximum fill level, for example. Values of the interfering signal suppression, in particular a clutter profile and/or an empty container profile, can thus be determined when the fill level is low and/or when the container is empty. Values of the interfering signal suppression determined in this way and/or a reference value of the evaluation parameter determined in this way can be stored in the memory apparatus and thus be used to evaluate the reception signal in subsequent measurements. Alternatively or additionally, the radar fill level measurement device can be configured to take, to initiate, and/or to repeat at least one reference measurement based on and/or n response to a user input.

According to one embodiment, the radar fill level measurement device is designed as a V-band radar fill level measurement device, as an E-band radar fill level measurement device, as a W-band radar fill level measurement device, as an F-band radar fill level measurement device, as a D-band radar fill level measurement device, as a G-band radar fill level measurement device, as a V-band radar fill level measurement device, and/or as a J-band radar fill level measurement device. In other words, the transmission frequency of the transmission signal can be between 60 GHz and 75 GHz (V-band), between 60 GHz and 90 GHz (E-band), between 75 GHz and 110 GHz (W-band), between 90 GHz and 140 GHz (F-band), between 110 GHz and 170 GHz (D-band), between 140 GHz and 220 GHz (G-band), between 170 GHz and 260 GHz (V-band), and/or between 220 GHz and 320 GHz (J-band).

A second aspect of the described embodiments relates to a method for operating a radar fill level measurement device. The method comprises the following steps:

determining, adjusting, adapting, and/or varying a transmitting power of a transmitting unit of the radar fill level measurement device;

transmitting, by means of the transmitting unit, a transmission signal, in particular a radar signal, at the determined transmitting power towards a medium;

receiving, by means of a receiving unit of the radar fill level measurement device, a reception signal reflected by the medium, in particular a reception radar signal;

varying, adapting and/or modifying, based on the determined transmitting power, a value of at least one evaluation parameter or of an interfering signal suppression and/or at least one measurement signal that correlates with the reception signal; and determining a fill level of the medium based on the reception signal and/or the varied measurement signal and/or based on the varied value of the at least one evaluation parameter or of the interfering signal suppression.

Another aspect of the described embodiments relates to a program element that, when executed on a controller of a radar fill level measurement device, instructs the radar fill level measurement device to carry out the method described above and in the following.

Another aspect of the described embodiments relates to a computer-readable medium, on which a program element is stored which instructs the controller of a radar fill level measurement device to carry out the method described above and in the following. Features and/or elements of the radar fill level measurement device as described above and below may be features, elements and/or steps of the method as described above and below. Features, elements and/or steps of the method as described above and below may also be features and/or elements of the radar fill level measurement device as described above and below.

Further features, advantages and possible uses of the described embodiments also appear in the following description of the embodiments and in the drawings.

BRIEF DESCRIPTION OF HE DRAWINGS

The drawings are schematic and are not shown to scale. Where the same reference signs are mentioned in the following description of the figures, they denote the same or similar elements.

In the following description, embodiments are explained in greater detail with reference to the drawings, in which.

DETAILED DESCRIPTION OF EMBODIMENTS

Figure 1:
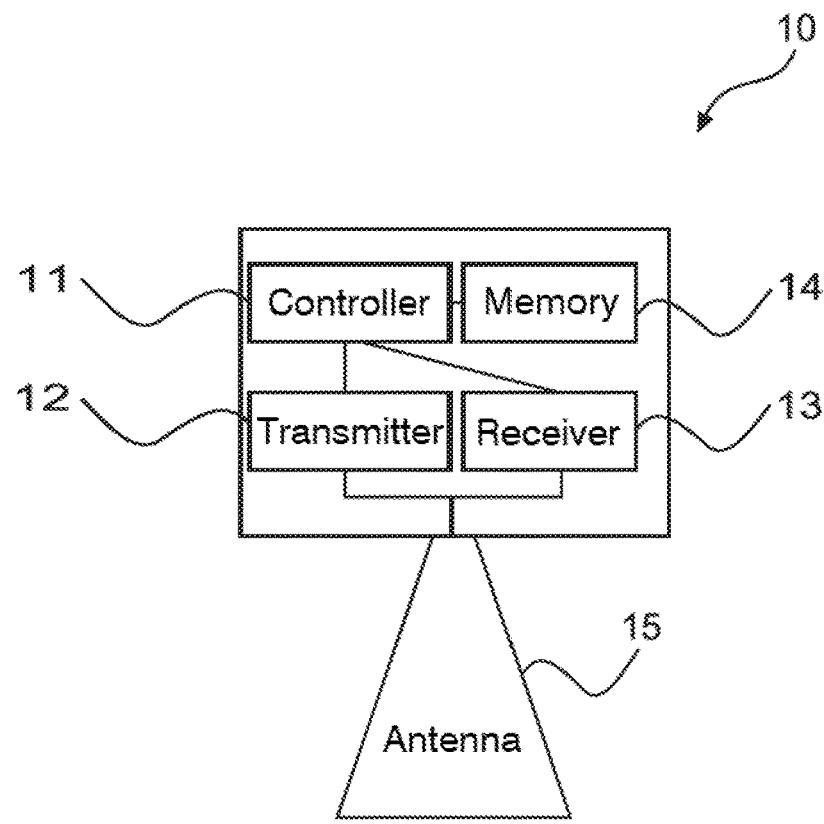
FIG. 1 is a block diagram of a radar fill level measurement device according to an embodiment.

FIG. 1 is a block diagram of a radar fill level measurement device 10 according to one embodiment. The radar fill level measurement device can be configured in particular to determine a fill level of a medium, for instance in a container, based on a propagation time principle.

The radar fill level measurement device 10 comprises a controller 11, a memory unit 14 and/or a memory apparatus 14, a transmitting unit 12, a receiving unit 13, and an antenna 15. The transmitting unit 12 and the receiving unit 13 can also be combined to form a transceiver unit 12, 13. A transmission signal can be emitted via the antenna 15 towards the medium, whereupon part of the transmission signal is reflected by the surface of the medium and can be received via the antenna 15 as a reception signal. The reception signal can optionally be filtered by means of at least one filter and/or amplified by means of at least one amplifier, for instance. The optionally filtered and/or amplified reception signal can then be sampled by means of an A/D converter and evaluated as a digital measurement signal that correlates with the reception signal.

The controller 11 is generally configured to communicate with the transmitting unit 12 and/or the receiving unit 13. In particular, the controller 11 can vary, modify and/or adapt a transmitting power and/or a transmitting level of the transmission signal. Alternatively or additionally, the controller 11 can be configured to retrieve a current transmitting power from the transmitting unit 12. The transmitting power and/or the transmitting level, can be described and/or given by an absolute, relative or percentage value. The controller 11 can thus obtain the information that, for example, the transmission signal is currently being transmitted at 80% of the maximum possible transmitting power.

In other words, the controller 11 is configured to determine the transmitting power. The controller 11 is also configured to determine, to adapt, to calculate, to vary and/or to modify, based on the determined transmitting power, a value of at least one evaluation parameter. For example, the value of the at least one evaluation parameter can be a threshold value; when said value is exceeded or not reached, part of the measurement signal, for instance a peak, is identified and/or evaluated by the controller 11 as a reflection by the surface of the medium. Based on the varied value of the at least one evaluation parameter, the fill level of the medium can thus be reliably determined, taking into account the transmitting power. The value of the at least one evaluation parameter may be stored in the memory apparatus 14, for instance.

The controller 11 can also be configured to determine, based on the reception signal and/or based on the measurement signal and based on a plurality of evaluation parameters, the fill level of the medium. For example, a set of evaluation parameters can be stored in the memory unit 14, which, and/or the values of which, can represent an interfering signal suppression, as shown in detail in FIGS. 3 and 4. The interfering signal suppression may include an interference point profile and/or an empty container profile, for instance. In order to determine the fill level of the medium, taking into account the current transmitting power, the controller 11 is configured to vary, to modify, to calculate and/or to adapt, based on the determined transmitting power, values of the interfering signal suppression and/or values of the set of parameters of the interfering signal suppression. A precision of the fill level determination for an adaptive transmitting level can thus be advantageously increased.

The interfering signal suppression and/or values of the interfering signal suppression may be determined, for instance as part of at least one reference measurement, by the radar fill level measurement device 10 when the fill level is known, preferably when the container is empty, at a known transmitting power. Another interfering signal suppression and/or values of another interfering signal suppression can be determined as part of another reference measurement at another transmitting power that can be different from the transmitting power of the preceding reference measurement. Based on an interpolation and/or extrapolation, values of the interfering signal suppression can then be adapted to the current transmitting power. The same method can also be applied to an evaluation parameter that is present, for instance as a threshold value, and/or to any other evaluation parameter.

Figure 2:
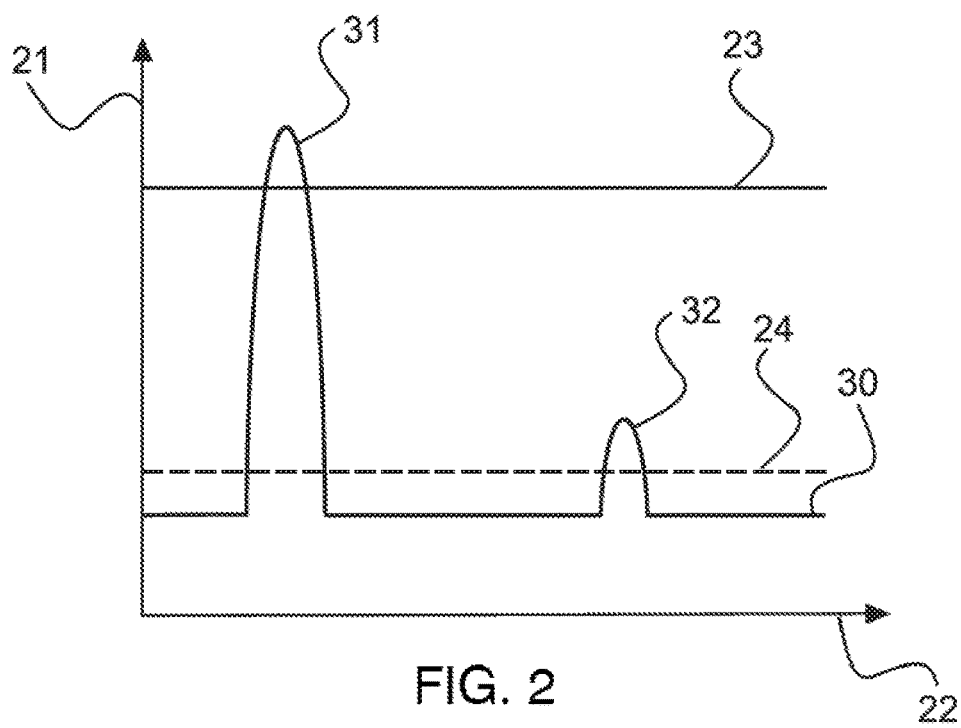
FIG. 2 shows a measurement signal determined by means of a radar fill level measurement device according to an embodiment.

FIG. 2 shows a measurement signal 30 determined by means of a radar fill level measurement device 10 according to an embodiment. In particular, the measurement signal 30 can be a digital representation of the reception signal, known as an echo curve 30, as may be present in the controller 11 and/or in the memory apparatus 14 of the radar fill level measurement device 10 after the A/D conversion. In this case, the x-axis 22 represents a time axis 22, i.e., a signal propagation time of the transmission and/or reception signal, and the y-axis 21 represents a signal strength 21 and/or amplitude 21 of the measurement signal 30. In this case, the time axis 22 correlates with a distance from the fill level measurement device 10. The measurement signal 30 comprises a first reflection 31, which can be produced, for example, by the antenna 15 of the radar fill level measurement device 10 reflecting part of the transmission signal, and a second reflection 32, which can be produced by the surface of the medium reflecting 32 the transmission signal. For evaluating the measurement signal, FIG. 2 also shows a threshold value 23, which is a value of an evaluation parameter.

The controller 11 is configured to identify and/or to evaluate the second reflection 32, which occurs after the first reflection 31 by the antenna 15, as a reflection 32 by the filling material surface, when the amplitude 21 of the first reflection 31 exceeds the threshold value 23. The defined threshold 23 may correspond, for instance, to a threshold at a maximum transmitting power of the radar fill level measurement device 10. The transmission signal in the example shown in FIG. 2 has been transmitted at a reduced transmitting power, meaning that the resulting reflection 32 of the measurement signal 30 by the filling material surface does not reach and/or exceed the threshold value 23. The reflection 32 of the fill level would therefore not be identified as a fill level.

According to an embodiment, the controller 11 is therefore configured to determine a current transmitting power and to adapt, to modify, and/or to vary the threshold value 23 based on the determined transmitting power. Based on the determined transmitting power, the controller 11 can lower the threshold value 23 to a lower threshold value 24 such that the reflection 32 exceeds the adapted threshold value 24 and can be determined as a reflection 32 by the filling material surface. The threshold value 24 can be calculated by the controller 11, for instance based on the current transmitting power, a formula, a model, and/or a characteristic map, and/or stored in the memory apparatus 14.

Alternatively or additionally, the measurement signal 30 and/or the reception signal can be increased by the controller 11 based on the current transmitting power such that the reflection 32 reaches and/or exceeds the threshold value 23 and is thus identified as a reflection 32 by the filling material surface.

Figure 3:
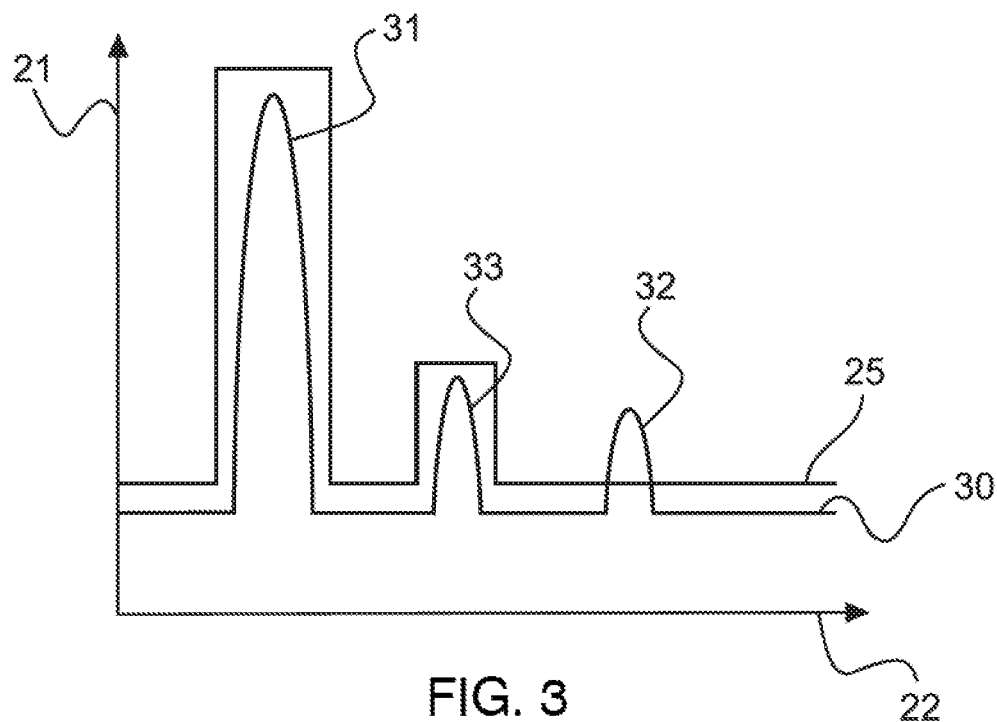
FIG. 3 shows a measurement signal determined by means of a radar fill level measurement device according to an embodiment and having an interfering signal suppression.

FIG. 3 shows a measurement signal 30 determined by means of a radar fill level measurement device 10 according to an embodiment and having an interfering signal suppression 25. In particular, FIG. 3 shows a signal evaluation of the measurement signal 30 based on the interfering signal suppression 25. Similarly to FIG. 2, the measurement signal 30 may be a digital representation of the reception signal, i.e., an echo curve 30, as may be present in the controller 11 and/or in the memory apparatus 14 of the radar fill level measurement device 10 after the A/D conversion. In this case, the x-axis 22 represents a time axis 22, i.e., a signal propagation time of the transmission and/or reception signal, and the y-axis 21 represents a signal strength 21 and/or amplitude 21 of the measurement signal 30. In this case, the time axis 22 correlates with a distance from the fill level measurement device 10, meaning that the fill level can be determined based on the measurement signal 30.

The interfering signal suppression 25 may include an interference point profile and/or an empty container profile, for instance. For example, the interfering signal suppression 25 may comprise for this purpose a set of evaluation parameters, which can be stored in the memory unit 14. Each of the evaluation parameters of the interfering signal suppression can correspond to a time interval, and the values of the respective evaluation parameters can correspond to an amplitude and/or a signal strength of the measurement signal 30 in this time interval. The interfering signal suppression 25 can thus form a curved line 25, with which the measurement signal 30 can be compared in order to determine the fill level.

FIG. 3 shows a reflection 31 by the antenna 15 and an interference reflection 33, which can be produced by container fixtures. FIG. 3 also shows a reflection 32 by the filling material surface, which can be identified on the basis of the interfering signal suppression 25. For example, the controller 11 can be configured to reject reflections 31 and 33 when they do not exceed the values of the interfering, signal suppression 25. The controller 11 can also be configured to identify the reflection 32 as a reflection 32 coming from the filling material surface when the reflection 32 exceeds the values of the interfering signal suppression 25. The fill level can be reliably determined in this way. The interfering signal suppression 25 can be calculated, for instance, from the received measurement signal of, a reference measurement, for example by means of a filter. In the case of a defined fill level, preferably an empty container, the container and the reflections thereof are measured. In addition, for the reference measurement, the transmitting power of the radar fill level measurement device 10 is known.

Figure 4:
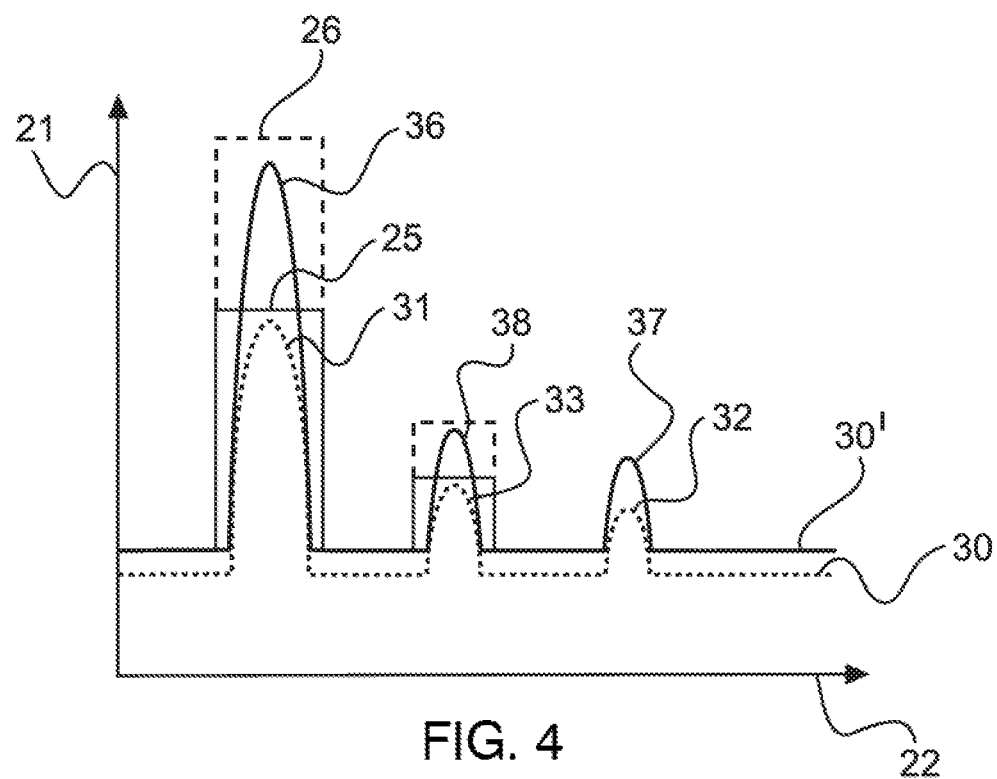
FIG. 4 shows a variation of the interfering signal suppression from FIG. 3.

FIG. 4 shows a variation, modification, and/or adaptation of the interfering signal suppression 25 from FIG. 3 by means of the controller 11 of the radar fill level measurement device as a function of the transmitting power of the transmission signal. Similarly to FIG. 3, the individual peaks 31, 32, 33 in the measurement signal 30, which has been determined based on a transmission signal at a first transmitting power and/or a reception signal at a first reception power, show a reflection 31 by the antenna 15, a reflection 33 by an interfering object, and a reflection 32 by the filling material surface. FIG. 4 also shows a second measurement signal 30', which has been determined based on a transmission signal at a second transmitting power and/or a reception signal at a second reception power. In this case, the second transmitting power is greater than the first transmitting power, and therefore the amplitudes of the reflections 36, 37, 38 of the second measurement signal 30' are in each case greater than the amplitudes of the reflections 31, 32, 33 of the first measurement signal 30. In this case, the reflections 36 and 38 of the second measurement signal 30', i.e., at the higher transmitting power, exceed values of the interfering signal suppression 25. The controller 11 could thus identify the reflections 36, 38 as coming from the filling material surface.

In order to avoid an incorrect measurement of the fill level, the controller 11 is configured to determine the current transmitting power, for instance based on requesting the transmitting power from the transmitting unit 12. The controller 11 itself can also specify the transmitting power. The controller 11 is also configured to adapt and/or to modify, based on the determined transmitting power, values of the evaluation parameters, i.e., values of the interfering signal suppression 25. In the example shown in FIG. 4, the controller determines, for instance, values of another and/or a current interfering signal suppression 26, in order to take into account the increased transmitting power. In other words, the controller 11 or the electronic evaluation system adapt the interfering signal suppression 25 to the varied transmitting power of the radar fill level measurement device 10, which leads to a calculated current interfering signal suppression 26. For the interfering signal suppression 26, only the reflection 37 of the filling material surface reaches and/or exceeds values of the interfering signal suppression 26, whereas the reflections 36, 38 fall below said values and are therefore not identified as reflections by the filling material surface. The fill level can thus be reliably determined.

As an alternative or in addition to the variation of the interfering signal suppression 25, the reception signal received by the receiving unit and/or the correlating measurement signal 30 can also be varied and/or adapted according to the current transmitting power. In the example of FIG. 4, the measurement signal 30' at the higher transmitting power can be scaled and/or shifted in order to provide the measurement signal 30, which can then be compared with the values of the interfering signal suppression 25.

Figure 5:
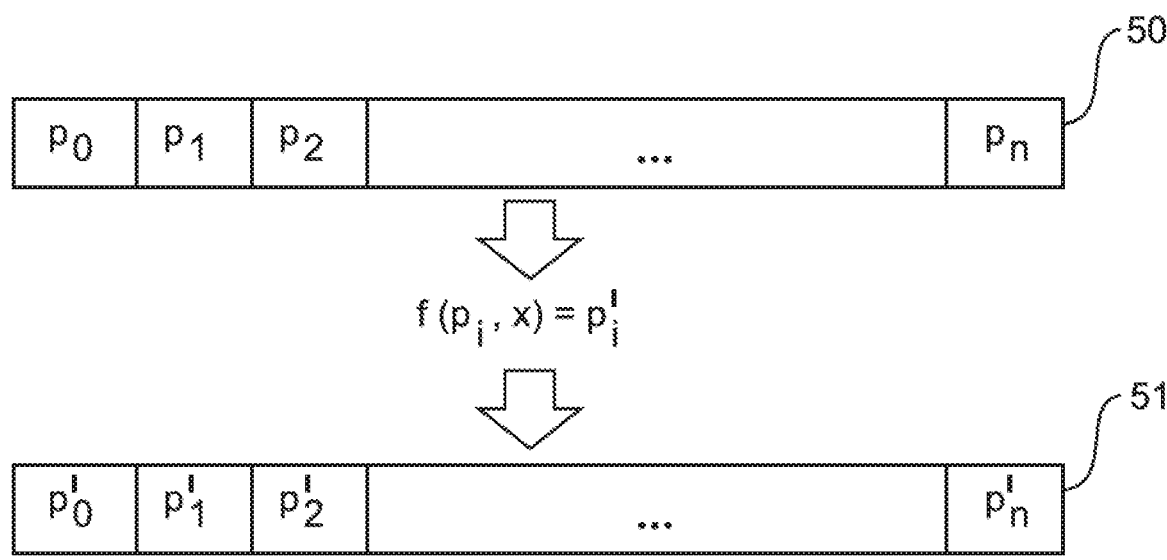
FIG. 5 shows a variation of values of evaluation parameters by a radar fill level measurement device according to an embodiment.

The first interfering signal suppression 25 can be ascertained, for example, when the container is empty and at a minimum transmitting power. The calculated interfering signal suppression 26 can be determined, for example, on the basis of a known behaviour, relationship and/or a formula between a minimum and maximum transmitting power. Between the minimum and maximum transmitting power, there can be, for example, a specific difference in amplitude in the measurement signal, for instance a difference of 3 dB. Insofar as parameters of this kind and/or a behaviour of the transceiver unit 12, 13 of this kind are known, for example by measuring and/or modelling the circuit, an adapted interfering signal suppression 26 can be calculated. Values of the evaluation parameters can thus be determined for the current transmitting power, for instance based on a mathematical formula, a model and/or a characteristic map, which formula can represent and/or describe the relationship between the values of the evaluation parameters and the transmitting power, wherein the current transmitting power can be used as an input variable in the formula, as shown in FIG. 5.

In addition, the interfering signal suppression 26 can be determined by a second reference measurement at a second transmitting power. In this case, the first transmitting power can correspond to a minimum transmitting power, and the second transmitting power can correspond to a maximum transmitting power. The controller 11 can then determine, based on interpolation and/or scaling between the values of the first interfering signal suppression 25 and the values of the second interfering signal suppression 26, values of the interfering signal suppression for a current transmitting power. The interpolation can occur linearly, quadratically, logarithmically or exponentially, for example, in each case proportionally or inversely proportionally to the transmitting power. The controller 11 can also modify the interfering signal suppression by means of shifting and/or scaling.

The interfering signal suppression 25 can be ascertained, for instance, when the radar fill level measurement device 10 is started up. This can be automatically carried out by the controller 11 of the radar fill level measurement device 10 and/or initiated by a user input, for instance by pressing a button and/or by actuating a control element of the fill level measurement device 10. The controller 11 can also be configured to periodically repeat the reference measurement of the interfering signal suppression, for example every time the container is empty or has a low fill level. In other words, reaching and/or falling below a specific fill level, in particular a minimum fill level, can trigger the reference measurement for the interfering signal suppression. The interfering signal suppression 25 or the interfering signal suppressions determined in this way can be stored in a memory unit 14 of the radar fill level measurement device 10.

By determining the interfering signal suppression at a minimum and at a maximum transmitting power, each transmitting power can be accordingly responded to, or the interfering signal suppression can be accordingly varied, adapted or modified. If, for example, transmission is carried out at only 50% of the maximum transmitting power, the interfering signal suppression 26 to be applied can be calculated from the average of the first interfering signal suppression 25 and the second interfering signal suppression 26.

It should be noted that more complex relationships between the transmitting power and the interfering signal suppression can also be taken into account by the controller 11, for example by means of a characteristic map or a function that converts the values of the interfering signal suppression at a first transmitting power and/or a second transmitting power into values of the interfering signal suppression at the current transmitting power. The current interfering signal suppression can be generated from the at least one reference measurement and/or using a mathematical model or a formula. In this case, the function may also be a non-linear function. Various functions dependent on the environmental conditions, for example pressure, temperature, air humidity, and/or gas composition, can also be stored. In other words, the controller 11 can also take into account other influencing variables, such as pressure, temperature, air humidity and/or gas composition in the container, in order to determine the value of the at least one evaluation parameter and/or to determine the values of the interfering signal suppression.

FIG. 5 shows a variation of values of evaluation parameters by a radar fill level measurement device 10 according to an embodiment.

In this case, a first set of evaluation parameters 50 having values $p_i$ i=1 . . . n of the evaluation parameters is converted by the controller 11 by means of a function f, which obtains the current transmitting power x and the parameters of the set of evaluation parameters 50 as input variables, into a second set of evaluation parameters 51 having values $p_i'$ i=1 . . . n of the evaluation parameters. In this case, the values $p_0, p_1, p_2 \ldots, p_n$ of the individual evaluation parameters can all be varied using the same function f or at least some of the evaluation parameters can be varied using different functions f, such that the variation and/or the relative difference between, for example, $p_0$ and $p'_0$, and $p_1$ and $p'_1$, does not necessarily need to be identical. It should be noted that the function may also depend on additional variables, for example temperature, air humidity, pressure, and/or gas composition in the container.

Figure 6:
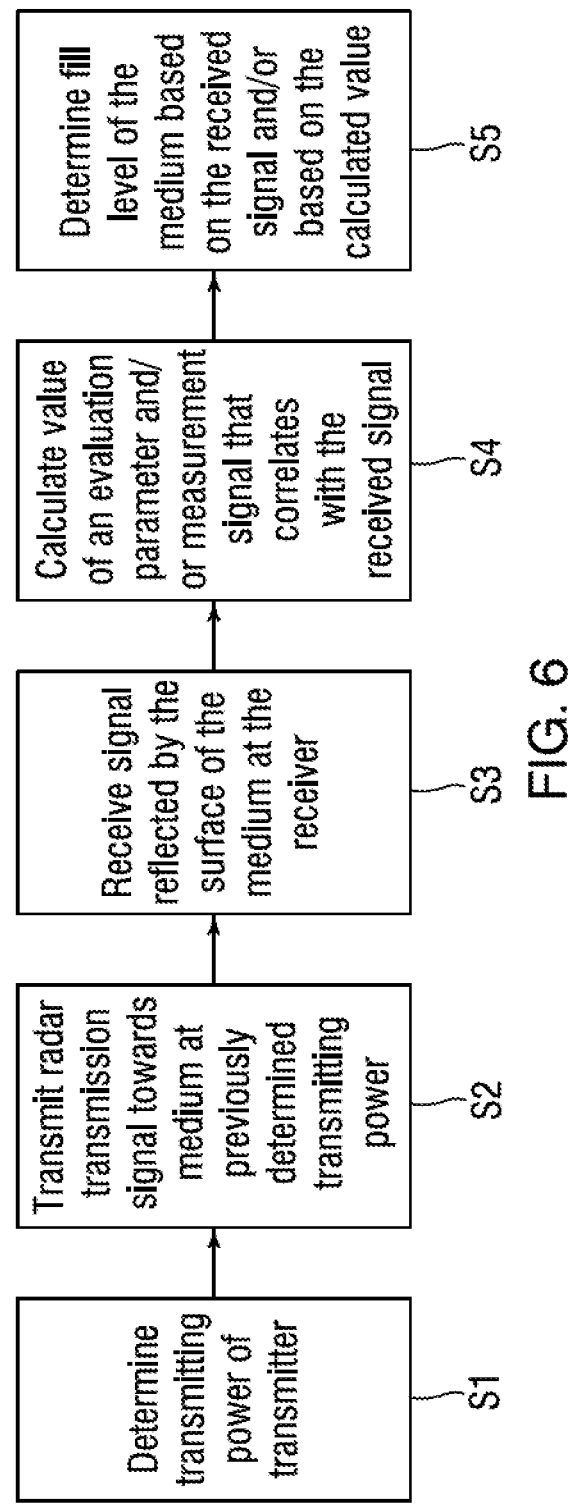
FIG. 6 is a flow diagram for illustrating steps of a method for operating a radar fill level measurement device according to an embodiment.

FIG. 6 is a flow diagram for illustrating steps of a method for operating a radar fill level measurement device 10 according to an embodiment.

In this case, the radar fill level measurement device 10 can be a radar fill level measurement device 10 as depicted in the previous figures.

In a first step S1, the transmitting power of the transmitting unit 12 of the radar fill level measurement device 10 is determined. In another step S2, a transmission signal, in particular a radar transmission signal, is transmitted towards the medium by the transmitting unit 12 at the previously determined transmitting power. The transmitted signal is reflected by the surface of the medium and, in step S3, received by the receiving unit 13 of the radar fill level measurement device 10. In step S4, at least one value of an evaluation parameter and/or of a measurement signal that correlates with the reception signal is calculated, determined, modified, varied, and/or adapted based on the determined transmitting power of the transmitting unit 12. In step S5, the fill level of the medium is determined based on the reception signal and/or based on the value of the at least one evaluation parameter. As a result, the evaluation of a measurement signal of a radar fill level measurement device is simplified and the quality of the measurement is improved.

The sequence of the individual steps referred to above should only be considered by way of example. Individual steps may also be carried out in parallel.

Alternatively or additionally, the following steps may be carried out in the context of the method for operating the radar fill level measurement device 10. In one step, the radar fill level measurement device can be put into operation and a measurement signal of the reference measurement, i.e., an interfering signal suppression, can be stored. A measurement cycle can then be carried out and the current transmitting level can be determined. The transmission signal can be transmitted and the reception signal can be received. Values of the interfering signal suppression and/or at least one threshold value can be calculated based on the determined transmitting power. The reception signal can be converted into a digital measurement signal and compared with calculated values of the interfering signal suppression and/or with the at least one threshold value. The fill level can then be determined from, the received measurement signal, the adapted interfering signal suppression and/or the threshold value.

As explained above, not only parameters and curved lines, but also values and variables that can themselves be derived from the received measurement signal, i.e. the reception signal and/or the measurement signal, can be adapted to the transmitting level.

Fill level measurement devices may also log the amplitudes of the reflections in the container, for example. In particular the amplitude of the reflection of the medium surface indicates whether the fill level measurement device 10 measures the current measurement situation in a sufficiently precise manner or whether the process conditions have deteriorated. The amplitude is plotted, for example, against the location, in order to thus obtain an amplitude profile of the reflection of the fill level in the whole tank, with which profile the amplitude of the reflection of the fill level of the current measurement can be compared. In order to be able to carry out this step, i.e., comparing the amplitude of the measurement with amplitudes of previous measurements, the transmitting level should remain the same or, according to an embodiment, the amplitude of the reflection or the amplitude profile itself should be recalculated.

The situation is similar for the use of tracking methods. For these track-forming methods, all reflections in the current measurement signal can be compared with the reflections of previous measurements. In this case, all reflections of the same origin are assigned to one track by the amplitude and position of the reflection being compared with previous measurements. If the transmitting level is now adapted, this can also be taken into account when tracking, such that the reflection can remain assigned to the track.

In order to suppress interference on the received measurement signal, successive measurement signals of different measurements are averaged and then only the resulting ensemble average value is subjected to the signal evaluation. Adapting the transmitting level thus also affects the ensemble averaging. The averaging size, e.g., a factor of a recursion, can thus be varied by means of the transmitting level.

For the sake of completeness, it should be noted that "comprising" and "including" do not exclude the possibility of other elements or steps, and "one" or "a" does not exclude the possibility of a plurality. It should also be pointed out that features or steps described with reference to one of the above embodiments may also be used in combination with other features or steps of other above-described embodiments. Reference signs in the claims should not be treated as limiting.

We claim:

1. A radar fill level measurement device for determining a fill level of a medium, the radar fill level measurement device comprising:
    a transmitter configured to transmit a transmission signal towards the medium;
    a receiver configured to receive a reception signal reflected by the medium; and
    a controller configured to determine the fill level of the medium based on the reception signal and based on at least one evaluation parameter,
    wherein the radar fill level measurement device is configured to vary a transmitting power of the transmission signal,
    wherein the controller is further configured to determine a current transmitting power of the transmission signal,
    wherein the controller is further configured to vary, based on the determined current transmitting power, a value of the at least one evaluation parameter, such that the fill level is determined taking into account the transmitting power,
    wherein the at least one evaluation parameter includes a threshold value for an amplitude of at least one measurement signal that correlates with the reception signal, and
    wherein the controller is further configured to vary the threshold value based on the determined current transmitting power.

2. The radar fill level measurement device according to claim 1,
    wherein the controller is further configured to determine the fill level of the medium based on a plurality of evaluation parameters, and
    wherein the controller is further configured to determine and/or to vary, based on the determined current transmitting power, a value of each evaluation parameter of said plurality.

3. The radar fill level measurement device according to claim 1,
    wherein the controller is further configured to vary the value of the at least one evaluation parameter linearly or logarithmically with the transmitting power, and/or
    wherein the controller is further configured to vary at least one measurement signal that correlates with the reception signal linearly or logarithmically with the transmitting power.

4. The radar fill level measurement device according to claim 1,
    wherein the at least one evaluation parameter includes an interfering signal suppression, which comprises information relating to a position of at least one interfering object.

5. The radar fill level measurement device according to claim 4,
    wherein the interfering signal suppression further comprises a clutter profile, which correlates with the position of the at least one interfering object, and/or
    wherein the interfering signal suppression further comprises an empty container profile, which correlates with a geometry of a container for the medium.

6. The radar fill level measurement device according to claim 1,
    wherein the controller is further configured to determine a reference value of the at least one evaluation parameter by means of at least one reference measurement at a predetermined transmitting power, and
    wherein the controller is further configured to determine a functional relationship between values of the at least one evaluation parameter and the transmitting power based on the at least one reference measurement.

7. The radar fill level measurement device according to claim 1, wherein the controller is further configured to
    determine a first reference value of the at least one evaluation parameter based on a first reference measurement at a first transmitting power,
    determine a second reference value of the at least one evaluation parameter based on a second reference measurement at a second transmitting power, which is different from the first transmitting power, and
    determine a functional relationship between values of the at least one evaluation parameter and the transmitting power based on the first reference measurement and the second reference measurement.

8. The radar fill level measurement device according to claim 7,
    wherein the first transmitting power is a maximum transmitting power, and/or
    wherein the second transmitting power is a minimum transmitting power.

9. The radar fill level measurement device according to claim 1,
    wherein the controller is further configured to vary the transmitting power of the transmission signal based on a temporally preceding reception signal.

10. The radar fill level measurement device according to claim 1,
    wherein the controller is further configured to vary the transmitting power of the transmission signal in a continuous and/or stepwise manner between a minimum transmitting power and a maximum transmitting power.

11. The radar fill level measurement device according to claim 1,
    wherein the controller is further configured to vary the transmitting power by transmitting a control signal to the transmitter, and/or wherein the controller is further configured to determine the transmitting power by querying the transmitter.

12. A method for operating a radar fill level measurement device, the method comprising:
- determining a transmitting power of a transmitter of the radar fill level measurement device;
- transmitting, by the transmitter, a transmission signal towards a medium at the determined transmitting power;
- receiving, by the receiver, a reception signal reflected by the medium;
- varying, based on the determined transmitting power, a value of at least one evaluation parameter, wherein the at least one evaluation parameter includes a threshold value for an amplitude of the at least one measurement signal that correlates with the reception signal, and wherein varying the value of the at least one evaluation parameter includes varying the threshold value; and
- determining a fill level of the medium based on the reception signal and based on the varied value of the at least one evaluation parameter.

13. A nontransitory computer-readable storage medium having a program stored therein, which, when executed on a controller of a radar fill level measurement device, instructs the radar fill level measurement device to perform a method according to claim 12.

* * * * *